(12) United States Patent
Alles et al.

(10) Patent No.: US 7,831,200 B2
(45) Date of Patent: Nov. 9, 2010

(54) SYSTEM AND METHOD FOR IDENTIFYING THE PATH OR DEVICES ON THE PATH OF A COMMUNICATION SIGNAL

(75) Inventors: Martin Alles, Vienna, VA (US); Joseph P. Kennedy, Jr., Great Falls, VA (US); John P. Carlson, Dulles, VA (US)

(73) Assignee: Andrew, LLP, Hickory, NC (US)

( * ) Notice: Subject to any disclaimer, the term of this patent is extended or adjusted under 35 U.S.C. 154(b) by 443 days.

(21) Appl. No.: 10/586,745

(22) PCT Filed: May 11, 2005

(86) PCT No.: PCT/US2005/016453
§ 371 (c)(1),
(2), (4) Date: Jun. 23, 2008

(87) PCT Pub. No.: WO2005/114869
PCT Pub. Date: Dec. 1, 2005

(65) Prior Publication Data
US 2009/0215389 A1 Aug. 27, 2009

Related U.S. Application Data

(60) Provisional application No. 60/570,082, filed on May 12, 2004, provisional application No. 60/570,081, filed on May 12, 2004, provisional application No. 60/570,067, filed on May 12, 2004.

(51) Int. Cl.
*H04B 1/60* (2006.01)
*H04B 17/02* (2006.01)

(52) U.S. Cl. .................. 455/9; 455/11.1; 455/501; 455/24

(58) Field of Classification Search .............. 455/9, 455/11.1, 16, 15, 24, 500, 517, 67.11, 501, 455/452.2, 464, 13.1, 63.1, 67.13, 445
See application file for complete search history.

(56) References Cited

U.S. PATENT DOCUMENTS

| | | | |
|---|---|---|---|
| 4,475,243 A | 10/1984 | Batlivala et al. | |
| 6,353,729 B1 | 3/2002 | Bassirat | |
| 6,501,955 B1 * | 12/2002 | Durrant et al. | 455/456.1 |
| 7,062,224 B2 * | 6/2006 | Baker et al. | 455/9 |
| 7,295,808 B2 * | 11/2007 | Soliman | 455/13.1 |
| 2002/0061763 A1 | 5/2002 | Weissman | |
| 2003/0086362 A1 | 5/2003 | Hasegawa et al. | |
| 2005/0130587 A1 | 6/2005 | Suda et al. | |

* cited by examiner

*Primary Examiner*—John Lee
(74) *Attorney, Agent, or Firm*—Duane Morris, LLP

(57) ABSTRACT

A system and method of applying a known modification in the form of a distortion to a signal to enable a determination if a signal received by a first node is received directly from a second node or indirectly through a repeater. The repeater receives a primary signal and creates a secondary signal as a function of the primary signal and a known distortion, wherein the known distortion identifies the repeater. The primary signal is transmitted and injected with the secondary signal as the first signal to the primary receiver.

29 Claims, 5 Drawing Sheets

SYSTEM AND METHOD FOR IDENTIFYING THE PATH OR DEVICES ON THE PATH OF A COMMUNICATION SIGNAL

CROSS REFERENCES

The present non-provisional application claims priority benefit of co-pending provisional application Ser. No. 60/570,082, titled SYSTEM AND METHOD FOR IDENTIFYING THE PATH OR DEVICES ON THE PATH OF A COMMUNICATION SIGNAL filed May 12, 2004, the entirety of which is hereby incorporated by reference.

This non-provisional application claims priority benefit of co-pending Provisional Patent Application Ser. No. 60/570,081, titled SYSTEM AND METHOD FOR IDENTIFYING THE PATH OR DEVICE ON THE PATH OF A COMMUNICATION SIGNAL USING (1+r(t)) AMPLITUDE MODULATION, filed May 12, 2004, the contents of which are herein incorporated by reference.

This non-provisional application claims priority benefit of co-pending Provisional Patent Application Ser. No. 60/570,067, titled SYSTEM AND METHOD FOR DETECTING A MOBILE STATION OPERATING THROUGH A REPEATER, filed May 12, 2004, the contents of which are herein incorporated by reference.

BACKGROUND

Applicant's disclosure is directed generally towards a wireless communications network for determining whether a signal from a mobile appliance is operated on by a repeater or other network device.

The use of wireless communication devices such as telephones, pagers, personal digital assistants, laptop computers, etc., hereinafter referred to collectively as "mobile appliances," has become prevalent in today's society.

FIG. 1 shows a conventional mobile-appliance communication system having base stations 10 a-c for communicating with a mobile appliance 20. Each base station 10 contains signal processing equipment and an antenna for transmitting to and receiving signals from the mobile appliance 20 as well as other base stations. A Base Station Controller ("BSC") and/or Mobile Switching Center ("MSC") 45 typically is connected to each base station 10 through a wire line connection 41.

To meet the ever growing demand for mobile communication, wireless communication systems deploy repeater stations to expand range and concentration of coverage. In FIG. 1, a repeater 50a, associated with base station 10a, is located to extend the coverage area to encompass the back side of the mountain 1. The repeater 50b, associated with base station 10c, is mounted on a building and is used to provide service within the building 2.

Repeaters typically fall into two categories: (1) non-translating, also known as wideband, and (2) translating, also known as narrowband. As shown in FIG. 2a, a non-translating repeater 250 simply passes the forward $F_{f1}$ and reverse $R_{f1}$ frequencies from the base station 210 and mobile appliance 220 respectively to and from the repeater coverage location. Often wideband repeaters are "in-building" or serve limited coverage areas. While the description of non-translating repeaters above and translating repeaters below are described in reference to frequency, their operation can equally be described in terms of channels, and the use of the term frequency should not be construed to limit the scope of the present disclosed subject matter.

A translating repeater assigns the mobile to a different traffic channel unbeknownst to the base station, mobile switch, MSC, and the base station controller. As shown in FIG. 2b, the translating repeater uses the base station traffic channel $R_{f1}$ for repeater 250 to base station 210 communication while the mobile appliance 220 utilizes a separate frequency $R_{f2}$ for mobile to repeater communications. Translating repeaters act similarly in the forward direction using $F_{f1}$ from the base station 210 to the repeater station 250 and $F_{f2}$ from the repeater station 250 to the mobile appliance 220. In both cases, the existence of the repeater is usually transparent to the network.

The function of the repeater station can be assumed to be equivalent to converting all signals in some received bandwidth from a Radio Frequency (RF) to some Intermediate Frequency (IF). The IF signal bandwidth is then up-converted by suitably frequency shifting this bandwidth while concurrently applying both amplification and a fixed delay to the signals.

For example, let the set of signals transmitted by N mobiles in the repeaters' input bandwidth be denoted by $$S(t) = \sum_{k=1}^{N} a(k)x(k, t)\sin(w, t),$$

where the signal from a given mobile is denoted by x(k, t). The signal x(k, t) is contained in the repeater bandwidth and w is the angular frequency center of the RF bandwidth. The repeater downshifts the aggregate signal to generate $$D(t) = \sum_{k=1}^{N} a(k)x(k, t)\sin(vt),$$

in which v is now representative of the center of the IF bandwidth. The entire signal D(t) is now converted back to RF by operations that are equivalent to forming the signal $$R(t+T) = G\sum_{k=1}^{N} a(k)x(k, t)\sin(vt)\cos(wt - vt) + G\sum_{k=1}^{N} a(k)x(k, t)\cos(vt)\sin(wt - vt),$$

in which G is the repeater gain. The last equation can be written in a more convenient, mathematical manner by noting that R(t) can be derived from D(t) by writing it as R(t+T)= Re{G exp(j(w−v)tI(t))}, where G exp(j(w−v)t) is the complex representation of the multiplicative signal introduced by the repeater on the downshifted signal bandwidth and I(t) is the complex representation of D(t).

Essentially, the function of the repeater is to convert the RF signal to an IF signal, delay and amplify that IF signal, up-convert the signal back to RF, and transmit the signal. This is true for both translating and non-translating repeaters.

Repeaters typically communicate with the host base station via an RF link as shown in FIG. 3 between base station 310 and repeater 350a. This connection allows remote operation of the repeater without physical ties back to the host base station, which is particularly advantageous in rugged or other areas where laying lines is difficult or costly. Some repeaters, generally non-translating repeaters, use a fiber optic or copper wire "tether" instead of an RF link to communicate with the host base station as shown in FIG. 3, where base station 310 is connected to repeater station 350b by tether 351. RF signals are placed onto the tether at the repeater and then summed into the normal base station antenna path at the antenna feed interface 311 at the host base station. After integration into the normal base station antenna path, the signal from the repeater is indistinguishable to the base station regarding its origin (e.g., from the base station antennas or from a tether). In this tether architecture as well, the host base station has no knowledge of the repeater's existence or that a call is being served by the repeater.

Neither the base station nor the switch knows that a repeater or other network device is serving a call. For example, a repeater installed as an in-building distribution system would use indoor antennas to communicate with the indoor handsets and an outdoor antenna to communicate with the host base station. In order to accomplish this, there is a need to overcome the deficiencies in the prior art by employing a novel system and method that is capable of identifying when a mobile's signal is being received via a repeater or other network device.

In view of this need, it is an object of the disclosed subject matter to present a method for determining whether a signal is received directly from the mobile or from a repeater in the communication network.

These objects and other advantages of the disclosed subject matter will be readily apparent to one skilled in the art to which the disclosure pertains from a perusal of the claims, the appended drawings, and the following detailed description of the preferred embodiments.

DETAILED DESCRIPTION

Figure 1:
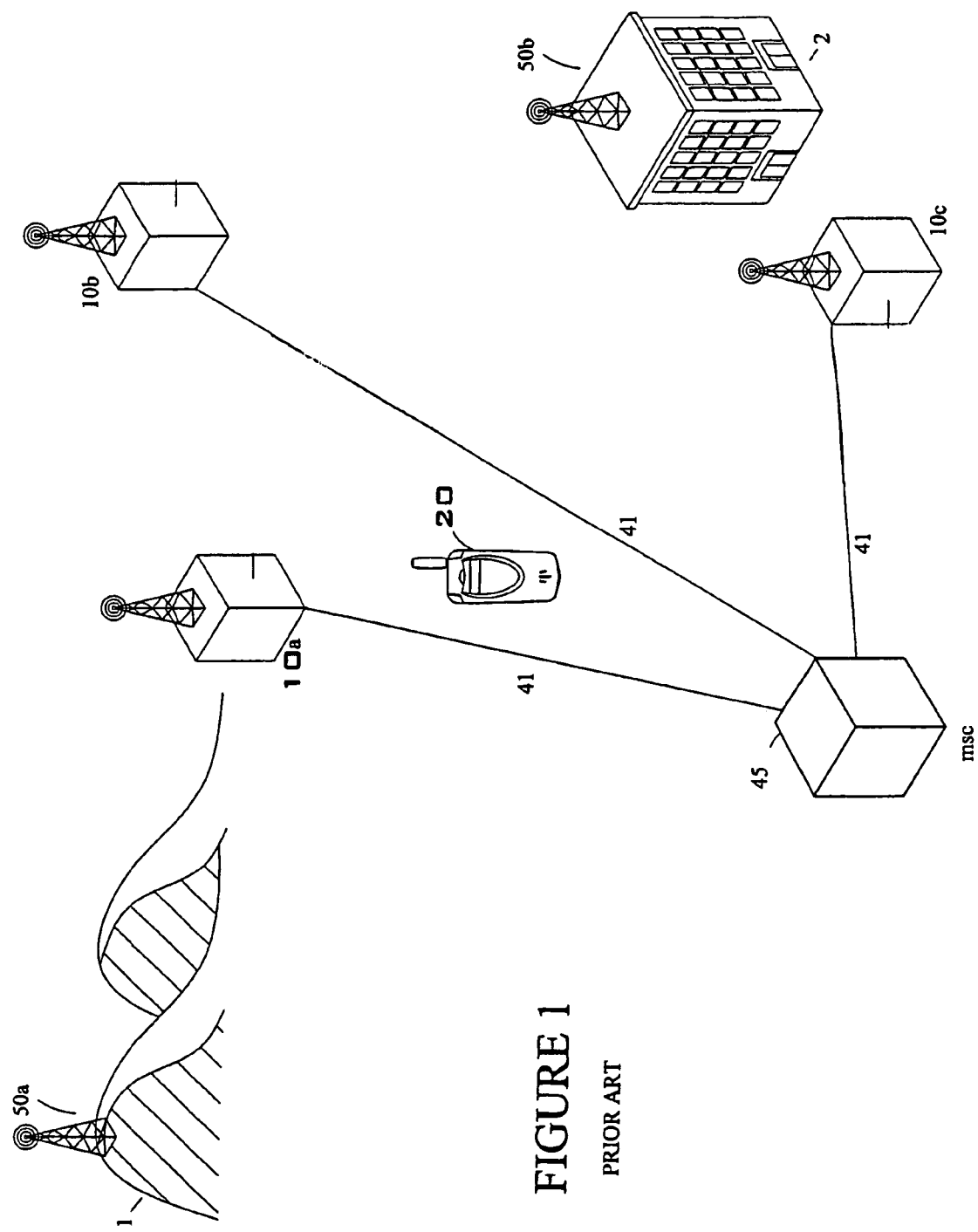
FIG. 1 is a prior art wireless communication system.
Figure 2A:
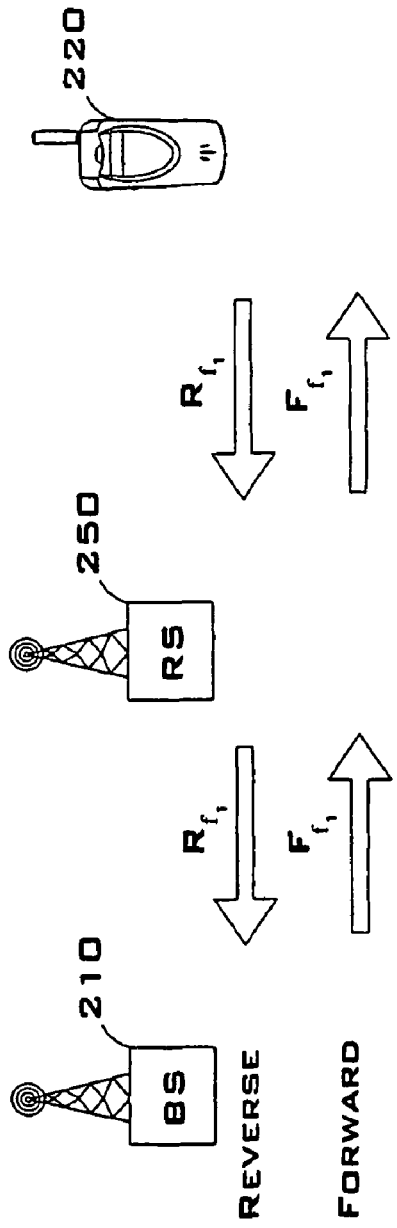
FIG. 2a is an illustration of the operation of a prior art non-translating repeater station.
Figure 2B:
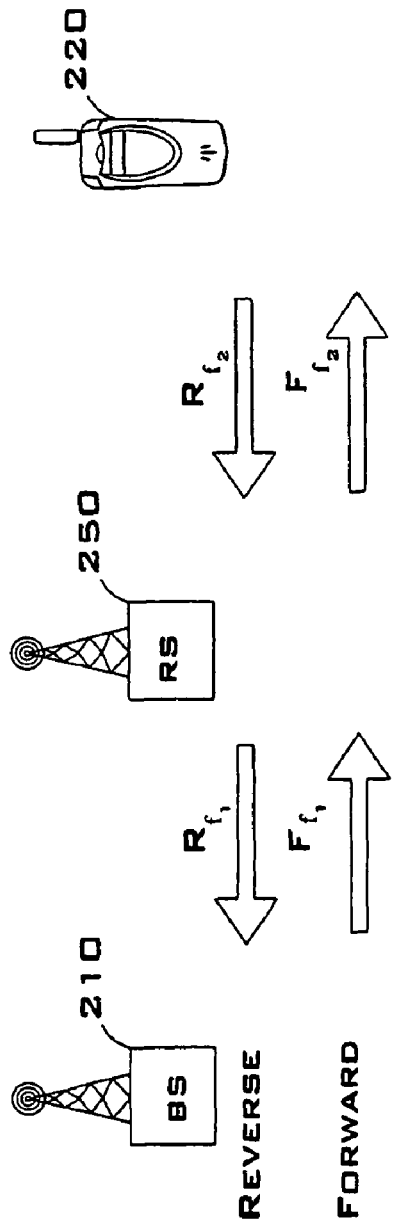
FIG. 2b is an illustration of the operation of a prior art translating repeater station.
Figure 3:
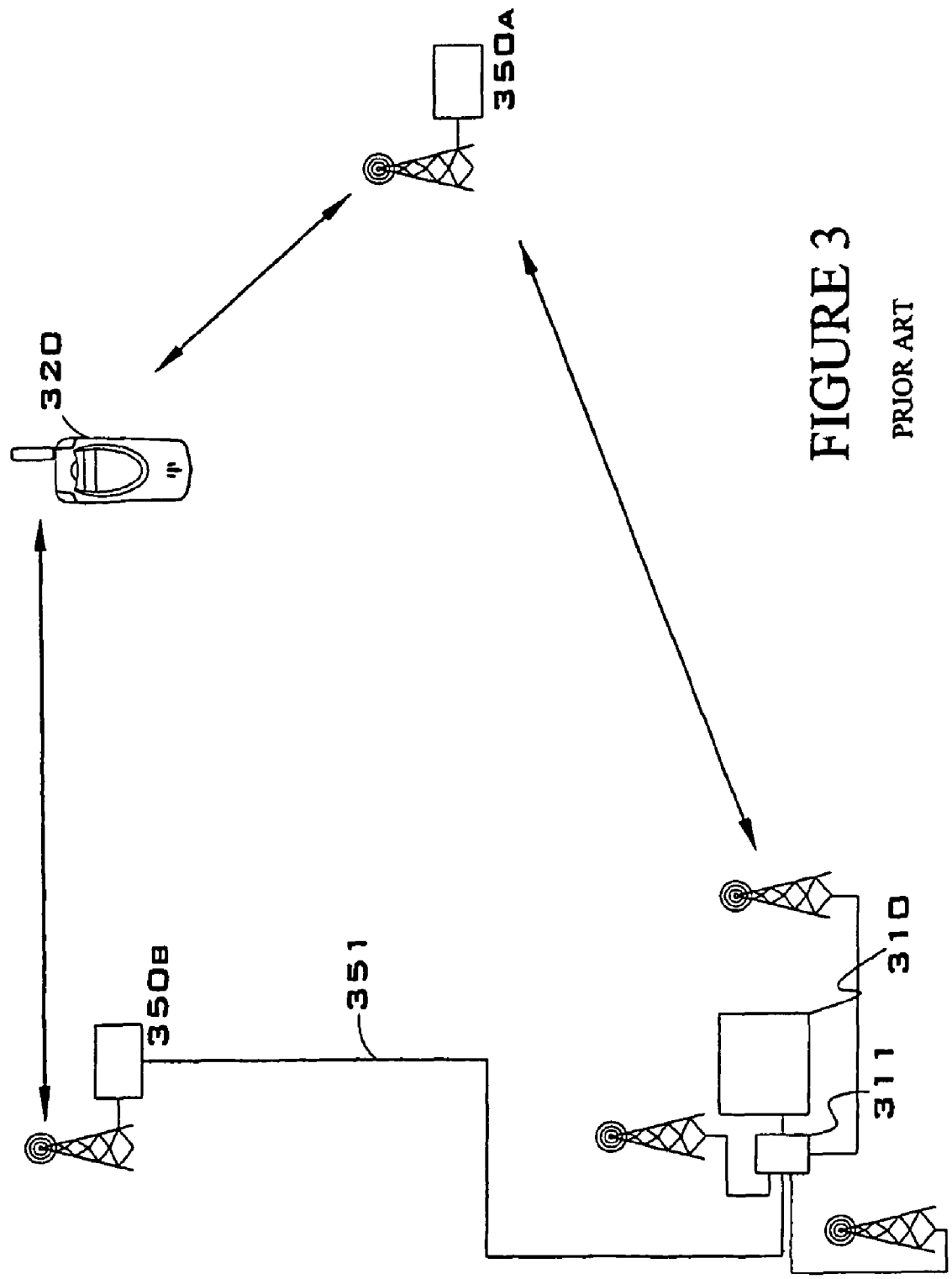
FIG. 3 is an illustration of a prior art wireless communication system with repeater stations connected with an RF link and over a tether.

An important aspect of the presently disclosed subject matter is that a network analysis system can determine when a received signal from a mobile has passed through a repeater. Prior art systems do not have this capability and consequently treat all the signals received by the base station as having been received directly from the target mobile. For example, the ability to determine if a signal from a mobile has passed through a repeater enables embodiments of the disclosed subject matter in a network analysis system to provide more efficient network management. The foregoing embodiments are exemplary only and shall not be used to limit the invention.

The present subject matter relates to the case where signals can be received at base stations, or other receivers, either directly from the mobile appliance or through a repeater. The ability to discern the difference between direct signals and repeated signals (i.e., signals that arrive via a repeater) allows the network analysis system to collect data important to system operators. In the forthcoming discussions the subject matter will be described in terms of a network analysis system, however as noted above, any network receiver or sensor receiving a signal from the repeaters can employ the described method.

This disclosed subject matter allows repeater identification via the insertion of a distortion encoded onto, over or into the primary signal in such manner that it is transparent to the primary receiver, such as a base station, mobile station or other network device such that the operation of the primary receiver remains identical in the presence or absence of the secondary information obtainable attributable to the distortion. The secondary information attributable to the distortion, however, because of its transparency is only recoverable by a secondary receiver which has access to both the input and output of the primary receiver. However, implementation of the present subject matter may include a primary receiver and secondary receiver sharing some commonality, and need not actually be physically separated. The secondary information is inserted as a secondary signal or secondary signals at one or more devices in the path of the primary signal as it traverses from the transmitter to the primary receiver An aspect of the current subject matter involves the formation of the secondary signal. The secondary signal is formed as a function of both the device through which the primary signal passes and the primary signal. Mathematically, s'(t) represents the secondary signal injected at a device with distortion i, s'(t)=$f$(i,s(t)). The function $f$( ) represents the mapping and s(t) of course the primary signal.

The secondary signal is modified such that it appears to be a component of the distortion of whatever nature, experienced on the channel or link of the communication signal. Typical distortions on a communication link or path are thermal noise or other interfering signals; however other introduced distortions are also envisioned. The distortion may be additive as in a co-channel signal or an Amplitude Modulation of the primary signal or it may be multiplicative as in a Phase or Frequency Modulation of the primary signal. If, for example, the distortion is to appear as additive noise, the modification is to scale the secondary signal so that it is below the power level of the noise, thus imperceptible to the primary receiver. The Secondary signal is transmitted within the same channel as the primary signal, that is, in the same time period, slot, bandwidth or other generic channel characterization.

Figure 4:
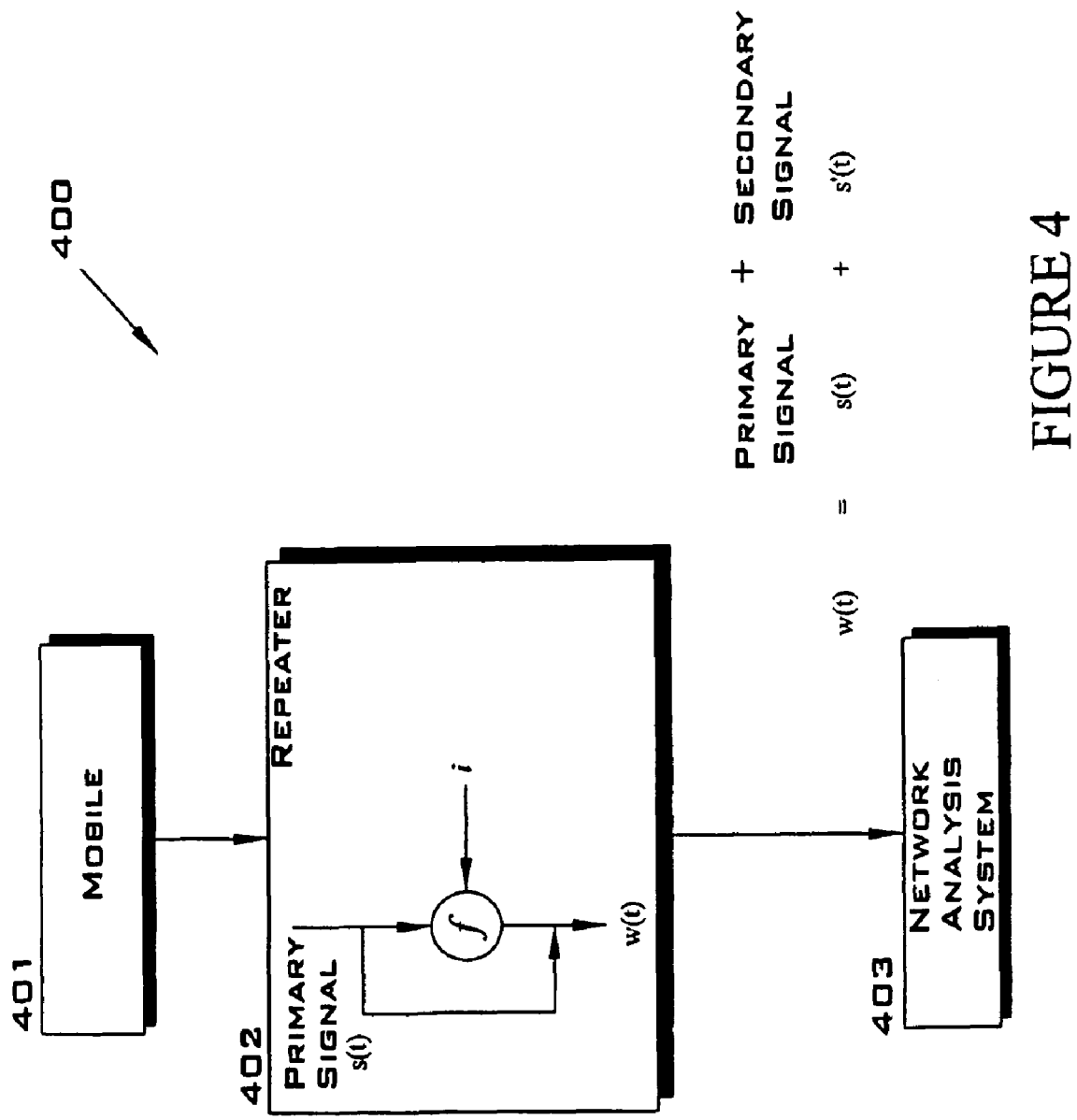
FIG. 4 is a schematic of an embodiment of a communication system according to an embodiment of the present subject matter.

An aspect of the disclosed subject matter that needs to be highlighted is that the secondary signal s'(t) is formed as a function $f$( ) of the primary signal s(t) and the distortion i. As noted above, the second signal differs based not only on the particular repeater but also on the primary signal that is input to the repeater. As shown in FIG. 4, the repeater 402 receives a primary signal from the mobile appliance 401 or other network transmitter. The primary signal s(t) is then operated on by a function $f$(s(t),i) where i is the distortion unique to the repeater. The output of the repeater is a signal w(t), where w(t) includes both the primary signal s(t) and the secondary signal s'(t). The network analysis system 403 then receives and processes the signal w(t) as described below to determine if the signal was received via a repeater and, if so, the specific repeater.

The function $f$( ) generating the secondary signal from the primary signal and the known distortion has the property that given the output of the primary receiver, i.e. the primary signal, and the received signal, the function can be inverted so that the particular distortion is revealed.

The secondary receiver may have access to both the input and the output of the primary receiver. The secondary receiver removes the primary signal from the input signal at the primary receiver, thus exposing the secondary signal. That secondary receiver may also receive the transmitted signal independently of the primary receiver and only require the primary signal from the primary receiver.

The secondary receiver implements the inverting function given by $i=g(s'(t),s(t))$ where $g(\ )$ inverts $f(\ )$. With the distortion i then revealed, the secondary receiver may then identify the device associated with the determined distortion i. The present subject matter equally envisions multiple devices in the path may be identified using the appropriate function $g(\ )$ that represent the need inversions for each function $f(\ )$ each of which may have been operating at different device locations along the primary signal path. For example if a primary signal transmitted from a mobile through a first repeater and then a second repeater and finally to a base station, the primary signal would be injected with a distortion (in this case additive) from the first repeater as a function $f_1(\ )$ resulting in a transmitted signal $w(t)=s(t)+f_1(s(t), i_1)$, the primary signal is then operated on by the second repeater in which a signal is injected with a second distortion from the second repeater as a $f_2(\ )$ resulting in a second transmitted signal $w_2(t)=w(t)+f_2(w(t), i_2)$. The primary receiver extracts the primary signal $s(t)$ and provides it to the secondary receiver, the secondary receiver then using $g_2(\ )$, the inverse of $f_2(\ )$, obtains the distortion associated with the second repeater $i_2$ and then using $g_1(\ )$, the inverse of $f_1(\ )$, the distortion associated with the first repeater $i_1$ is obtained. This process may continue for any number of repeaters or network devices operating on the signal received by the primary receiver. $f_1(\ )$ and $f_2(\ )$, and similarly their inverses $g_1(\ )$ and $g_2(\ )$, need not be different, only the distortions i need be unique to the network device, if they are to be distinguished.

Figure 5:
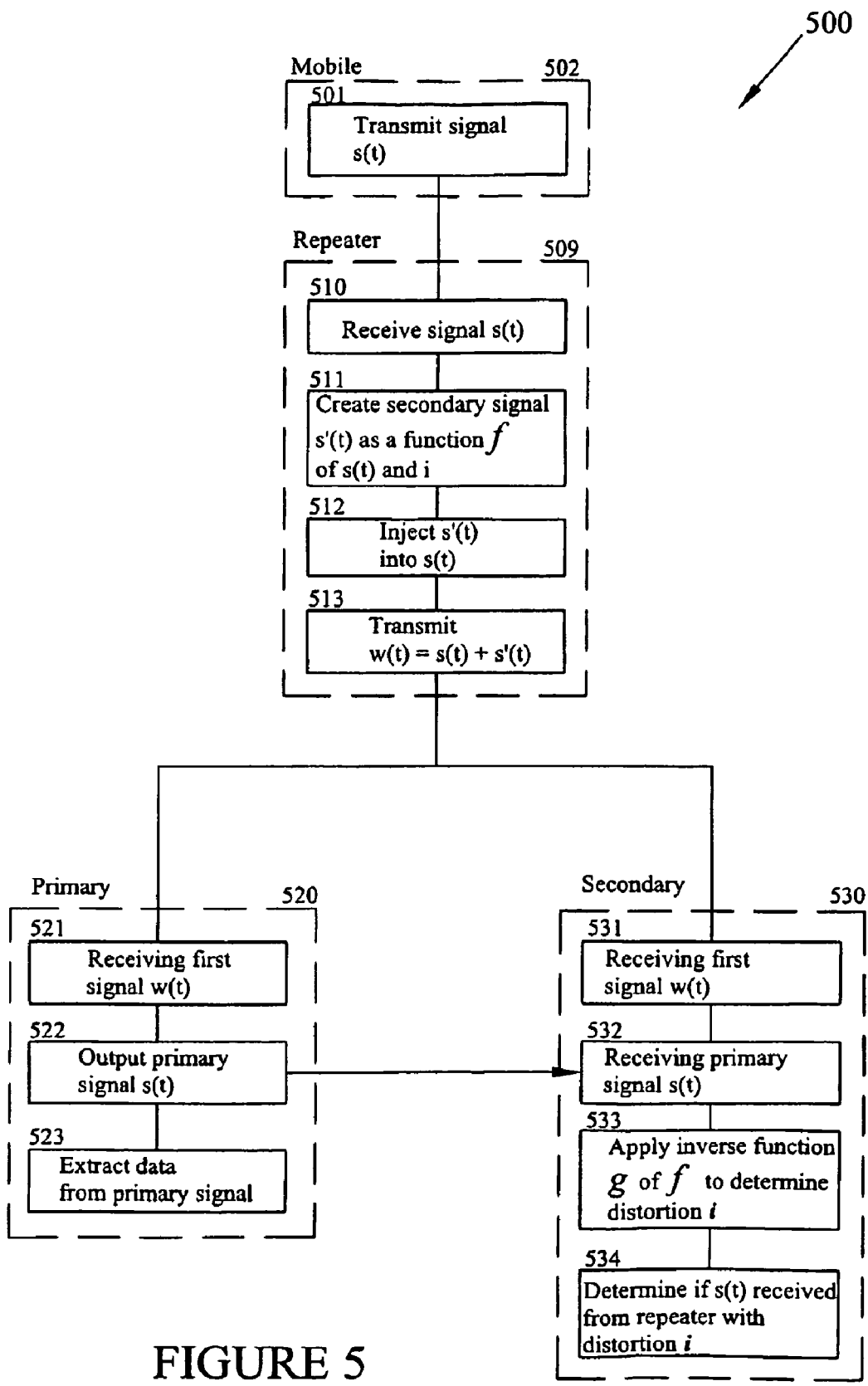
FIG. 5 is a flowchart of a method for determining if and, if so which network device has operated on a signal according to an embodiment of the present subject matter.

FIG. 5 is a flow chart for an embodiment of the current subject matter. The communication system 500 includes for illustration only, a mobile 502, a repeater 509 and a primary and secondary receivers 520 and 530. The mobile unit transmits a signal $s(t)$ which is received at the repeater 509. The repeater in addition to amplifying the signal also creates a secondary signal $s'(t)$ as a function of a unique distortion i and the primary signal $s(t)$ as shown in block 511. This secondary signal is inserted into the primary signal in block 512 and the repeater transmits the resultant signal $w(t)$ as shown in block 513.

The primary receiver 520 receives the repeater transmitted signal $w(t)$ in block 521 and outputs the primary signal $s(t)$ in block 522, the data from the primary signal is then extracted as shown in block 523. If needed, the primary signal may also be reconstructed from the derived data, thus enhancing the quality of the recovered signal. The operation of the primary receiver in the current subject matter is unaffected by the secondary signal.

The secondary receiver receives the first signal $w(t)$ and the primary signal $s(t)$ from the primary receiver as shown in blocks 531 and 532 respectively. With the primary signal and the first signal $w(t)$, an inverse function $g(\ )$ of $f(\ )$ is used to determine the distortion i, if any applied to the signal as shown in block 533. From the distortion i, the secondary receiver can determine if the received signal was operated on by a network device and if so by comparing the distortion to known distortions determine which repeater operated upon it as shown in block 534.

As an example of the methods described here, consider a primary signal $s(t)$ modified by a repeater using an additive Phase Modulation (PM) component. Let us assume the signal $s(t)$ is in complex form and that it has constant amplitude a. Let $x_i(t)$ denote the distortion, applied as a PM process onto the signal $s(t)$. Then the secondary signal is given by $cs(t) e^{jx_i(t)}$, where c is a constant scaling factor. The secondary receiver, given both the primary signal $s(t)$ recovered at the primary receiver, and the additive secondary signal, removes the primary signal from the sum and derives the distortion i using (under ideal circumstances) the operation $(1/j)(1/(ca^2))$ ln $[s^*(t)(w(t)-s(t))]$. The function $g(\ )$ used by the secondary receiver is then equivalent to the operation $(1/j)(1/(ca^2))$ ln $[s^*(t)(w(t)-s(t))]$, and the function $f(\ )$ used at the repeater is equivalent to $cs(t) e^{jx_i(t)}$.

The same Phase Modulated signal may also be applied as a multiplicative distortion. In this case the secondary signal can take the form $e^{js(t)x_i(t)}$, where $x_i(t)$ is unique to the repeater. Since this distortion is applied multiplicatively, the signal at the primary receiver is $s(t)e^{js(t)x_i(t)}$. The primary receiver is capable of recovering the original signal $s(t)$ since the distortion is required to permit this behavior by a proper selection of $x_i(t)$. The primary receiver then passes both the signal $s(t)$ and the signal $w(t)=s(t)e^{js(t)x_i(t)}$ to the secondary receiver which implements the inverting function $g(\ )$. The function $g(\ )$ is equivalent to the operation (under ideal conditions) given by $(1/j)(1/(a^2))(1/s(t))$ ln $[s^*(t)w(t)]$.

In both of the above cases we see that the provision of the primary signal $s(t)$ to the secondary receiver from the primary receiver is essential to the recovery of the distortion. That is, $s(t)$ must be recovered prior to recovering the distortion which identifies the repeater.

As another example, consider a co-channel secondary signal generated by applying an Amplitude Modulation (AM) to the entire repeater signal bandwidth and serving as an identifier, identifying that a mobile or other communication system device is being served through a particular repeater station, whose identity can be uniquely determined from the RF characteristics introduced by the repeater itself. The magnitude of the inband signal as well as any adjacent channel interference caused by the AM process can be controlled. When no signal is present in the repeater pass-band, the AM process can be applied so that it generates a signature signal buried deep within the noise. When a signal is present, the secondary signal can still be placed in the noise by suitably selecting the parameters of the AM process. Thus the primary receiver can recover the primary signal without any additional burden imposed by the existence of the secondary signal. The secondary receiver, having access to both the primary signal and the secondary signal can invert the secondary signal and thus uniquely identify the repeater or network device.

Thus, for example in an active cellular channel, the introduced repeater identification signal, the secondary signal, can be at a power level 9 dB or lower than the primary signal; whereas, in an inactive channel, the secondary signal will be 9 dB or lower than the preexisting noise in that channel. In every channel, the corresponding signature signal is preferably at a power level 9 dB or lower than the pre-existing signal level in that channel. The 9 dB value is chosen simply to quantify the concept and any other number can be selected with equal applicability. For a given primary signal $s(t)$, it is apparent that the secondary signal $s'(t)$ distinguishes the particular repeater. Thus each repeater has a unique secondary signal derived from the unique distortion i.

The collection of such distortions i over a set of repeaters, denoted S, may be drawn from sets of waveforms with specific properties, in the case where the distortion is an interfering signal. For example, the set S may be orthogonal, quasi-orthogonal, or shift-orthogonal. The properties of the distortions used to generate the set S will, among other things, depend on the number of repeaters implemented in a cellular system cell or sector. Code sequences such as Golay-Hadamard and other sequences are equally envisioned when appropriate.

No constraint exists on combining the scheme of this subject matter with other schemes to identify a repeater. For example, in a GSM cellular protocol, a parameter termed the Timing Advance (TA) parameter may be used to identify the radius at which a particular mobile may be located. This TA parameter may be used jointly with the scheme proposed here to increase the number of identifiable repeaters in a cell or sector.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What we claim is:

1. In a communication system including a primary receiver, a primary transmitter, and a repeater that applies a known distortion to a primary signal passing therethrough that identifies the repeater, where the primary receiver receives a first signal from the primary transmitter either directly or via the repeater, and where the first signal includes a primary signal and, if the first signal is received from the repeater, also includes a secondary signal that is a function of the primary signal and the known distortion applied by the repeater, the method of determining if a signal received by the primary receiver is received directly from the primary transmitter or indirectly through the repeater, comprising the steps of:

receiving the first signal at the primary receiver;
outputting the primary signal from the primary receiver;
receiving the first signal at a secondary receiver and obtaining the primary signal from the primary receiver;
applying an inverse function to the first signal and the primary signal to retrieve a distortion; and
determining whether the first signal has been received from the repeater by comparison of the distortion and known distortions.

2. The method of claim 1 wherein the communication system is a wireless communication system.

3. The method of claim 1 wherein the primary receiver is a network analysis system.

4. The method of claim 1 wherein the primary transmitter is a mobile unit.

5. The method of claim 1, wherein the primary signal is an uplink signal.

6. The method of claim 1, wherein the primary signal is a downlink signal.

7. The method of claim 1, wherein the primary signal is amplified such that the ratio of the primary signal to the secondary signal is greater than unity.

8. The method of claim 7, wherein the secondary signal is 9 dB less that the primary signal.

9. The method of claim 1, wherein the known distortion is additive noise.

10. The method of claim 1, wherein the known distortion is an interfering signal.

11. The method of claim 1, wherein the known distortion is applied additively.

12. The method of claim 1, wherein the known distortion is applied multiplicatively.

13. The method of claim 1, wherein the step of applying an inverse function further comprises applying a second inverse function to retrieve a second distortion; and the step of determining further comprises determining whether the first signal has also been received from another repeater by comparison of the second distortion and known distortions.

14. The method of claim 1, wherein the primary receiver is a mobile unit.

15. The method of claim 1, wherein the primary transmitter is a network analysis system.

16. In a wireless communication system having one or more repeaters, a first node and a second node, a method of determining if a signal received at the first node is received directly from the second node or via one of the one or more repeaters comprising:

creating, at the one or more repeaters, a secondary signal s'(t) that is a function f(i,s(t)) of a primary signal s(t) received from the second node and a known distortion, i, applied by the one or more repeaters, where i is unique for each of the one or more repeaters;
injecting the secondary signal s'(t) into the primary signal s(t) to form a first signal;
transmitting the first signal w(t) to the first node;
detecting at the first node the primary signal s(t);
removing the primary signal s(t) to recover the secondary signal s'(t);
determining a distortion from an inverse function g(s'(t),s(t)) of the secondary signal s'(t) and the primary signal s(t), where g is the inverse of f;
comparing the distortion i to the known distortions thereby determining if the signal is received via the one or more repeaters.

17. The method of claim 16, wherein the one or more repeaters are synchronized.

18. The method of claim 16, wherein the one or more repeaters are not synchronized.

19. The method of claim 16, wherein the step of removing the primary signal includes nulling the primary signal s(t) from the first signal.

20. The method of claim 16 wherein the first node is a network analysis system.

21. The method of claim 16 wherein the second node is a mobile unit.

22. The method of claim 16, wherein the primary signal is an uplink signal.

23. The method of claim 16, wherein the primary signal is a downlink signal.

24. The method of claim 16, wherein the first signal is amplified such that the ratio of the primary signal to the signature signal is greater than unity.

25. The method of claim 16, wherein the known distortion is noise.

26. The method of claim 16, wherein the known distortion is applied additively.

27. The method of claim 16 where the known distortion is applied multiplicatively.

28. The method of claim 16, wherein the first node is a mobile unit.

29. The method of claim 16, wherein the second node is a network analysis system.

* * * * *